(12) United States Patent
LaTulipe

(10) Patent No.: US 11,628,942 B2
(45) Date of Patent: Apr. 18, 2023

(54) TORQUE RIPPLE CONTROL FOR AN AIRCRAFT POWER TRAIN

(71) Applicant: PRATT & WHITNEY CANADA CORP., Longueuil (CA)

(72) Inventor: Eric LaTulipe, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 541 days.

(21) Appl. No.: 16/690,664

(22) Filed: Nov. 21, 2019

(65) Prior Publication Data

US 2020/0277071 A1 Sep. 3, 2020

Related U.S. Application Data

(60) Provisional application No. 62/812,342, filed on Mar. 1, 2019.

(51) Int. Cl.
*B64D 27/24* (2006.01)
*B64D 27/10* (2006.01)
*B64D 27/02* (2006.01)
*B64D 31/12* (2006.01)
*B64D 35/08* (2006.01)
*B64D 29/00* (2006.01)
*B64D 33/08* (2006.01)

(52) U.S. Cl.
CPC .............. *B64D 27/24* (2013.01); *B64D 27/02* (2013.01); *B64D 27/10* (2013.01); *B64D 29/00* (2013.01); *B64D 31/12* (2013.01); *B64D 33/08* (2013.01); *B64D 35/08* (2013.01); *B64D 2027/026* (2013.01)

(58) Field of Classification Search
CPC .. B64D 27/02; B64D 2027/026; B64D 27/10; B64D 27/24; B64D 29/00; B64D 31/12; B64D 33/08; B64D 35/08
USPC ............................................................ 701/3
See application file for complete search history.

(56) References Cited

U.S. PATENT DOCUMENTS

| 6,179,072 B1 | 1/2001 | Hou |
| 6,198,183 B1 | 3/2001 | Baeumel et al. |
| 6,335,581 B1 | 1/2002 | Warnke |
| 6,336,070 B1 * | 1/2002 | Lorenz .................. B60W 20/00 701/110 |

(Continued)

FOREIGN PATENT DOCUMENTS

| BR | 8701724 U2 | 6/2009 |
| BR | PI0702882 A2 | 3/2011 |

(Continued)

*Primary Examiner* — Brady W Frazier
(74) *Attorney, Agent, or Firm* — Norton Rose Fulbright Canada LLP

(57) ABSTRACT

A method includes providing thrust to an aircraft through a power train from a heat engine connected to the power train. The method includes controlling an electric motor connected to the power train to counter torque ripple in the power train from the heat engine. A system includes a power train for providing thrust to an aircraft. A heat engine is connected to the power train. An electric motor is operatively connected to the power train. A controller is operatively connected to control the electric motor. The controller includes machine readable instructions configured to cause the controller to control the electric motor to counter torque ripple in the power train from the heat engine.

18 Claims, 3 Drawing Sheets

(56) References Cited

U.S. PATENT DOCUMENTS

| | | | |
|---|---|---|---|
| 6,427,441 B2 | 8/2002 | Wustefeld et al. | |
| 6,537,047 B2 | 3/2003 | Walker | |
| 6,692,395 B2 | 2/2004 | Rodeghiero et al. | |
| 7,022,042 B2 | 4/2006 | Fleytman | |
| 7,098,569 B2 | 8/2006 | Ong et al. | |
| 7,247,967 B2 | 7/2007 | Ionel et al. | |
| 7,303,497 B1 | 12/2007 | Wige | |
| 7,316,629 B2 | 1/2008 | Nakagawa et al. | |
| 7,345,398 B2 | 3/2008 | Purvines et al. | |
| 7,398,946 B1 | 7/2008 | Marshall | |
| 7,418,820 B2 | 9/2008 | Harvey et al. | |
| 7,471,026 B2 | 12/2008 | Bender | |
| 7,503,173 B2 | 3/2009 | Dong et al. | |
| 7,726,426 B2 | 6/2010 | Beck et al. | |
| 7,827,787 B2 | 11/2010 | Cherney et al. | |
| 7,867,122 B2 | 1/2011 | Jones | |
| 7,958,725 B2 | 6/2011 | Elliott | |
| 8,217,544 B2 | 7/2012 | Osada et al. | |
| 8,342,995 B2 | 1/2013 | Grant | |
| 8,382,635 B2 | 2/2013 | Tampieri | |
| 8,435,156 B2 | 5/2013 | Christ | |
| 8,446,121 B1 | 5/2013 | Parsa et al. | |
| 8,471,429 B2 | 6/2013 | Kaiser et al. | |
| 8,495,870 B2 | 7/2013 | Sumiyoshi et al. | |
| 8,531,076 B2 | 9/2013 | Stabenow et al. | |
| 8,535,197 B2 | 9/2013 | Scekic | |
| 8,584,452 B2 | 11/2013 | Lloyd | |
| 8,596,054 B2 | 12/2013 | Law et al. | |
| 8,621,860 B2 | 1/2014 | Hennemann et al. | |
| 8,622,859 B2 | 1/2014 | Babbitt et al. | |
| 8,660,761 B2 | 2/2014 | Anderson et al. | |
| 8,663,047 B2 | 3/2014 | Schroth et al. | |
| 8,710,786 B1 | 4/2014 | Parsa et al. | |
| 8,747,267 B2 | 6/2014 | Sutherland | |
| 8,915,812 B2 | 12/2014 | Haglsperger et al. | |
| 8,943,820 B2 | 2/2015 | Carlton et al. | |
| 8,967,532 B2 | 3/2015 | Vialle | |
| 9,039,566 B2 | 5/2015 | Rudy | |
| 9,051,996 B2 | 6/2015 | During et al. | |
| 9,096,230 B2 | 8/2015 | Ries et al. | |
| 9,102,223 B2 | 8/2015 | Greenwood | |
| 9,109,682 B2 | 8/2015 | Lee et al. | |
| 9,206,885 B2 | 12/2015 | Rekow et al. | |
| 9,261,182 B2 | 2/2016 | Kato et al. | |
| 9,303,727 B2 | 4/2016 | Reimann et al. | |
| 9,343,939 B2 | 5/2016 | Schutten et al. | |
| 9,401,631 B2 | 7/2016 | Wu et al. | |
| 9,447,858 B2 | 9/2016 | Weeramantry et al. | |
| 9,458,864 B2 | 10/2016 | Hyon et al. | |
| 9,546,468 B2 | 1/2017 | Bang | |
| 9,551,400 B2 | 1/2017 | Hiasa et al. | |
| 9,683,585 B2 | 6/2017 | Akiyama et al. | |
| 9,735,638 B2 | 8/2017 | Herz et al. | |
| 9,963,855 B2 | 5/2018 | Jagoda | |
| 9,976,437 B2 | 5/2018 | McCune et al. | |
| 10,000,275 B2 | 6/2018 | Tendola et al. | |
| 10,024,341 B2 | 7/2018 | Zhang et al. | |
| 10,035,505 B2 * | 7/2018 | Kawai | B60W 20/17 |
| 10,086,946 B1 | 10/2018 | Zywiak et al. | |
| 10,122,227 B1 | 11/2018 | Long | |
| 10,183,744 B2 | 1/2019 | Gamble | |
| 10,287,917 B2 | 5/2019 | Schwarz et al. | |
| 10,374,477 B2 | 8/2019 | Niergarth et al. | |
| 2005/0178893 A1 | 8/2005 | Miller et al. | |
| 2005/0258306 A1 | 11/2005 | Barocela et al. | |
| 2006/0016196 A1 | 1/2006 | Epstein | |
| 2006/0016197 A1 | 1/2006 | Epstein | |
| 2006/0056971 A1 | 3/2006 | D'Anna | |
| 2006/0237583 A1 | 10/2006 | Fucke et al. | |
| 2007/0170307 A1 | 7/2007 | de la Cierva Hoces | |
| 2007/0264124 A1 | 11/2007 | Mueller et al. | |
| 2008/0141921 A1 | 6/2008 | Hinderks | |
| 2008/0145221 A1 | 6/2008 | Sun et al. | |
| 2009/0050103 A1 | 2/2009 | Heaton | |
| 2009/0229897 A1 | 9/2009 | Yutani et al. | |
| 2009/0267555 A1 * | 10/2009 | Schulz | H02P 29/50 318/432 |
| 2010/0264724 A1 | 10/2010 | Nelson et al. | |
| 2010/0285747 A1 | 11/2010 | Bauer et al. | |
| 2011/0215584 A1 | 9/2011 | Prokopich | |
| 2011/0236218 A1 | 9/2011 | Russ et al. | |
| 2011/0243566 A1 | 10/2011 | Truong | |
| 2011/0256973 A1 | 10/2011 | Werner et al. | |
| 2011/0266995 A1 | 11/2011 | Winfield et al. | |
| 2012/0025032 A1 | 2/2012 | Hopdjanian et al. | |
| 2012/0137684 A1 | 6/2012 | Yogev et al. | |
| 2012/0168557 A1 | 7/2012 | Edelson et al. | |
| 2012/0227389 A1 | 9/2012 | Hinderks | |
| 2012/0239228 A1 | 9/2012 | Vos | |
| 2012/0327921 A1 | 12/2012 | Schirrmacher et al. | |
| 2013/0026304 A1 | 1/2013 | Wang | |
| 2013/0082135 A1 | 4/2013 | Moret | |
| 2013/0119841 A1 | 5/2013 | Graf et al. | |
| 2013/0168489 A1 | 7/2013 | McIntee | |
| 2013/0181088 A1 | 7/2013 | Casado Montero et al. | |
| 2013/0227950 A1 | 9/2013 | Anderson et al. | |
| 2013/0287574 A1 | 10/2013 | Ebbesen et al. | |
| 2013/0300120 A1 | 11/2013 | Podrog | |
| 2013/0341934 A1 | 12/2013 | Kawanishi | |
| 2014/0010652 A1 * | 1/2014 | Suntharalingam | B64D 27/02 475/5 |
| 2014/0027568 A1 | 1/2014 | Fleddermann et al. | |
| 2014/0054411 A1 | 2/2014 | Connaulte et al. | |
| 2014/0117148 A1 | 5/2014 | Dyrla et al. | |
| 2014/0203739 A1 | 7/2014 | Chantriaux et al. | |
| 2014/0248168 A1 | 9/2014 | Chantriaux et al. | |
| 2014/0283519 A1 | 9/2014 | Mariotto et al. | |
| 2014/0318132 A1 | 10/2014 | Podrog | |
| 2015/0028594 A1 | 1/2015 | Mariotto | |
| 2015/0076949 A1 | 3/2015 | Alim | |
| 2015/0083852 A1 | 3/2015 | Moser et al. | |
| 2015/0151844 A1 | 6/2015 | Anton et al. | |
| 2015/0274306 A1 | 10/2015 | Sheridan | |
| 2015/0311755 A1 | 10/2015 | Hiebl et al. | |
| 2016/0010589 A1 | 1/2016 | Rolt | |
| 2016/0016670 A1 | 1/2016 | Sautreuil et al. | |
| 2016/0076446 A1 | 3/2016 | Bailey Noval et al. | |
| 2016/0218930 A1 | 7/2016 | Toilion et al. | |
| 2016/0305470 A1 | 10/2016 | Remer et al. | |
| 2017/0016398 A1 | 1/2017 | Thiriet et al. | |
| 2017/0016399 A1 | 1/2017 | Bedrine et al. | |
| 2017/0072755 A1 | 3/2017 | Zhou et al. | |
| 2017/0096233 A1 | 4/2017 | Mercier-Calvairac et al. | |
| 2017/0152055 A1 | 6/2017 | Mercier-Calvairac et al. | |
| 2017/0203839 A1 | 7/2017 | Giannini et al. | |
| 2017/0240273 A1 | 8/2017 | Yuen | |
| 2017/0241347 A1 | 8/2017 | Marconi et al. | |
| 2017/0284408 A1 | 10/2017 | Ricordeau et al. | |
| 2017/0305541 A1 | 10/2017 | Vallart et al. | |
| 2017/0328282 A1 | 11/2017 | Jensen et al. | |
| 2017/0370344 A1 | 12/2017 | Kassianoff | |
| 2018/0002025 A1 | 1/2018 | Lents et al. | |
| 2018/0003071 A1 | 1/2018 | Lents et al. | |
| 2018/0003072 A1 | 1/2018 | Lents et al. | |
| 2018/0003109 A1 | 1/2018 | Lents et al. | |
| 2018/0118335 A1 | 5/2018 | Gamble et al. | |
| 2018/0127103 A1 | 5/2018 | Cantemir | |
| 2018/0194483 A1 | 7/2018 | Schwoller | |
| 2018/0251226 A1 | 9/2018 | Fenny et al. | |
| 2018/0252115 A1 | 9/2018 | Himmelmann et al. | |
| 2018/0265206 A1 | 9/2018 | Himmelmann | |
| 2018/0266329 A1 | 9/2018 | Mackin | |
| 2018/0273197 A1 | 9/2018 | Chang et al. | |
| 2018/0319483 A1 | 11/2018 | Mayer et al. | |
| 2018/0339786 A1 * | 11/2018 | Thomassin | F01D 15/10 |
| 2018/0346111 A1 | 12/2018 | Karem et al. | |

FOREIGN PATENT DOCUMENTS

| | | |
|---|---|---|
| BR | PI0622106 A2 | 12/2011 |
| BR | PI1104839 A2 | 11/2012 |
| EP | 2226487 A2 | 9/2010 |
| EP | 2332235 A2 | 6/2011 |
| EP | 2478608 A2 | 7/2012 |

(56) References Cited

FOREIGN PATENT DOCUMENTS

| | | | |
|---|---|---|---|
| EP | 2238362 | B1 | 3/2015 |
| EP | 3292041 | A1 | 3/2018 |
| EP | 3327526 | A1 | 5/2018 |
| EP | 3327527 | A1 | 5/2018 |
| EP | 3350895 | A1 | 7/2018 |
| EP | 3405654 | A1 | 11/2018 |
| EP | 3423354 | A1 | 1/2019 |
| JP | 2006231974 | A | 9/2006 |
| JP | 2006270778 | A | 10/2006 |
| JP | 2006290187 | A | 10/2006 |
| JP | 2007137423 | A | 6/2007 |
| JP | 4215012 | B2 | 1/2009 |
| JP | 2009534928 | A | 9/2009 |
| JP | 2011516334 | A | 5/2011 |
| JP | 4973256 | B2 | 7/2012 |
| JP | 2013193533 | A | 9/2013 |
| JP | 5415400 | B2 | 2/2014 |
| JP | 2014076771 | A | 5/2014 |
| JP | 2014159255 | A | 9/2014 |
| JP | 2015077089 | A | 4/2015 |
| JP | 2015077091 | A | 4/2015 |
| JP | 2015137092 | A | 7/2015 |
| JP | 5867219 | B2 | 2/2016 |
| JP | 2017074804 | A | 4/2017 |
| JP | 2017150665 | A | 8/2017 |
| JP | 6199496 | B2 | 9/2017 |
| JP | 2017165131 | A | 9/2017 |
| JP | 6213494 | B2 | 10/2017 |
| JP | 2017534514 | A | 11/2017 |
| JP | 6376042 | B2 | 8/2018 |
| JP | 6397447 | B2 | 9/2018 |
| JP | 6430885 | B2 | 11/2018 |
| JP | 6433492 | B2 | 12/2018 |
| KR | 20070039699 | A | 4/2007 |
| KR | 20080086714 | A | 9/2008 |
| KR | 20080005377 | U | 11/2008 |
| KR | 20090110373 | A | 10/2009 |
| KR | 20110032973 | A | 3/2011 |
| KR | 20110087661 | A | 8/2011 |
| KR | 20120140229 | A | 12/2012 |
| KR | 20130006379 | A | 1/2013 |
| KR | 101277645 | B1 | 6/2013 |
| KR | 20130142491 | A | 12/2013 |
| KR | 101438289 | B1 | 9/2014 |
| KR | 101572184 | B1 | 11/2015 |
| KR | 101659783 | B1 | 9/2016 |
| KR | 20160143599 | A | 12/2016 |
| KR | 20170004299 | A | 1/2017 |
| KR | 101713800 | B1 | 3/2017 |
| KR | 101797011 | B1 | 11/2017 |
| WO | 2007086213 | A1 | 8/2007 |
| WO | 2011005066 | A2 | 1/2011 |
| WO | 2011107718 | A1 | 9/2011 |
| WO | 2011144188 | A1 | 11/2011 |
| WO | 2014108125 | A1 | 7/2014 |
| WO | 2014134506 | A1 | 9/2014 |
| WO | 2015107368 | A1 | 7/2015 |
| WO | 2015145036 | A1 | 10/2015 |
| WO | 2016074600 | A1 | 5/2016 |
| WO | 2017114643 | A1 | 7/2017 |
| WO | 2018044757 | A1 | 3/2018 |
| WO | 2018106137 | A2 | 6/2018 |
| WO | 2018191769 | A1 | 10/2018 |
| WO | 2018211227 | A1 | 11/2018 |

* cited by examiner

TORQUE RIPPLE CONTROL FOR AN AIRCRAFT POWER TRAIN

CROSS-REFERENCE TO RELATED APPLICATION

This application claims priority to U.S. Provisional Patent Application No. 62/812,342 filed Mar. 1, 2019, which is incorporated by reference herein in its entirety.

BACKGROUND

1. Field

The present disclosure relates to hybrid aircraft, and more particularly to control of hybrid power plants for aircraft.

2. Description of Related Art

Traditional aircraft have heat engines that burn hydrocarbon fuel to produce the thrust needed for flight. Hybrid electric aircraft can use hydrocarbon burning engines in combination with electric motors. Hybrid electric aircraft have been proposed in a variety of different configurations.

The conventional techniques have been considered satisfactory for their intended purpose. However, there is an ever present need for improved systems and methods for hybrid aircraft. This disclosure provides a solution for this need.

SUMMARY

A method includes providing thrust to an aircraft through a power train from a heat engine connected to the power train. The method includes controlling an electric motor connected to the power train to counter torque ripple in the power train from the heat engine.

The method can include detecting torque ripple and using feedback indicative of the torque ripple in the heat engine to control the electric motor. The method can include powering the power train with both the heat engine and the electric motor providing a combined torque during takeoff and climb, wherein the electric motor actively cancels torque ripple in the heat engine so that the combined torque has a lower amplitude than that of the torque ripple in the heat engine. The combined torque can be constant. The combined torque can be higher than peaks in the torque ripple of the heat engine.

The method can include powering the power train with the heat engine during cruise with zero net power delivered to the power train by the electric motor. The electric motor can alternate between positive, additive torque relative to the heat engine, and negative, subtractive torque relative to the heat engine to cancel the torque ripple. The electric motor can alternate between the positive, additive torque and the negative, subtractive torque without changing rotation direction of the electric motor. The method can include recuperating electrical energy from the electric motor into an electrical power storage system during the negative, subtractive torque. The heat engine and electric motor together can provide a combined torque having a magnitude that is between peaks and valleys in the torque ripple of the heat engine, e.g. wherein the combined torque is constant.

Providing thrust from the heat engine and power train can include providing the thrust from the heat engine to a combining gear box, and providing the thrust from the electric motor to the combining gear box in parallel mechanically with the heat engine. It is also contemplated that providing thrust from the heat engine and power train can include providing the thrust from the heat engine to a main gear box wherein the main gear box, heat engine, and electric motor are mechanically in series with one another. The heat engine and electric motor can be connected in mechanical series with at least one of a disconnect mechanism configured to allow independent rotation of the electric motor and heat engine, and/or a reduction gear box configured to allow rotation of the electric motor an heat engine at different rotational speeds from one another.

A system includes a power train for providing thrust to an aircraft. A heat engine is connected to the power train. An electric motor is operatively connected to the power train. A controller is operatively connected to control the electric motor. The controller includes machine readable instructions configured to cause the controller to control the electric motor to counter torque ripple in the power train from the heat engine.

A sensor can be operatively connected to the heat engine and to the controller to sense torque ripple in the heat engine and control the electric motor to counter the torque ripple with an active, closed control loop. A power storage system can be electrically connected to supply electrical power to the electric motor. The controller can include machine readable instructions configured to cause the electric motor to regenerate power to the power storage system during negative torque in the electric motor while countering torque ripple. The power train can include a combining gear box, wherein each of the heat engine and electric motor connect to the combining gear box in parallel with one another. The power train can include a main gear box with the electric motor and heat engine connected in series with one another and to the main gear box.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
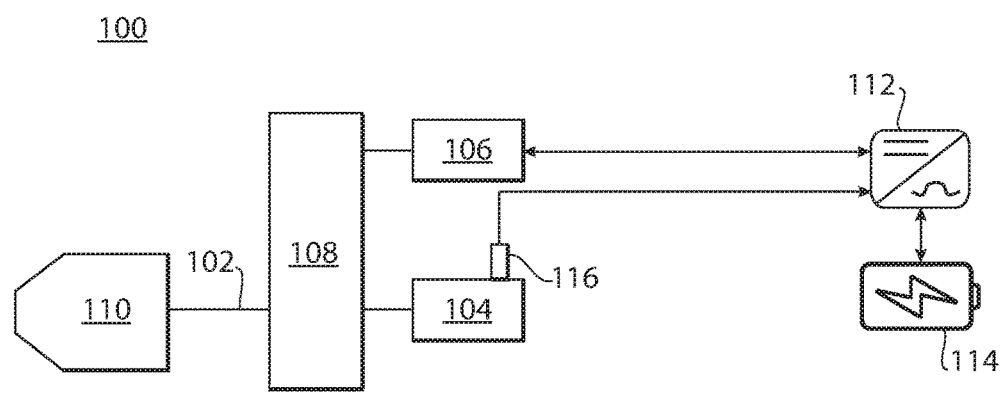
FIG. 1 is a schematic view of an embodiment of a system constructed in accordance with the present disclosure, showing a parallel configuration of the heat engine and electric motor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to control torque ripple in hybrid electric aircraft powertrains.

The system 100 includes a power train 102 for providing thrust to an aircraft. A heat engine 104 is connected to the power train 102. An electric motor 106 is operatively connected to the power train 102. The power train 102 includes a combining gear box 108, wherein each of the heat engine 104 and the electric motor 106 connect to the combining gear box 108 in parallel with one another. System 100 can provide providing thrust from the heat engine 104 and power train 102, which can include providing the thrust from the heat engine 104 to the combining gear box 108, and providing the thrust from the electric motor 106 to the combining gear box 108 in parallel mechanically with the heat engine 104. The combining gear box 108 in turn provides rotational power to a reduction gear box 110 which can be used to provide aircraft thrust, e.g. by turning a propeller or the like.

A controller 112 is operatively connected to control the electric motor 106. A power storage system 114, e.g. including a bank of rechargeable batteries, is be electrically connected to the controller 112 to supply electrical power to the electric motor 106. The controller 112 includes machine readable instructions configured to cause the controller 112 to control the electric motor 106 to counter torque ripple in the power train 102 from the heat engine 104. A sensor 116 is operatively connected to the heat engine 104, or another system location in the system 100 such as reduction gear box 110, power train 102, and/or combining gear box 108, and to the controller 112 to sense torque ripple in the heat engine 104 to generate feedback indicative of the torque ripple so the controller 112 can control the electric motor 106 to counter the torque ripple with an active, closed control loop. The controller can include machine readable instruction configured to cause the controller to perform motor control as described below.

Figure 2:
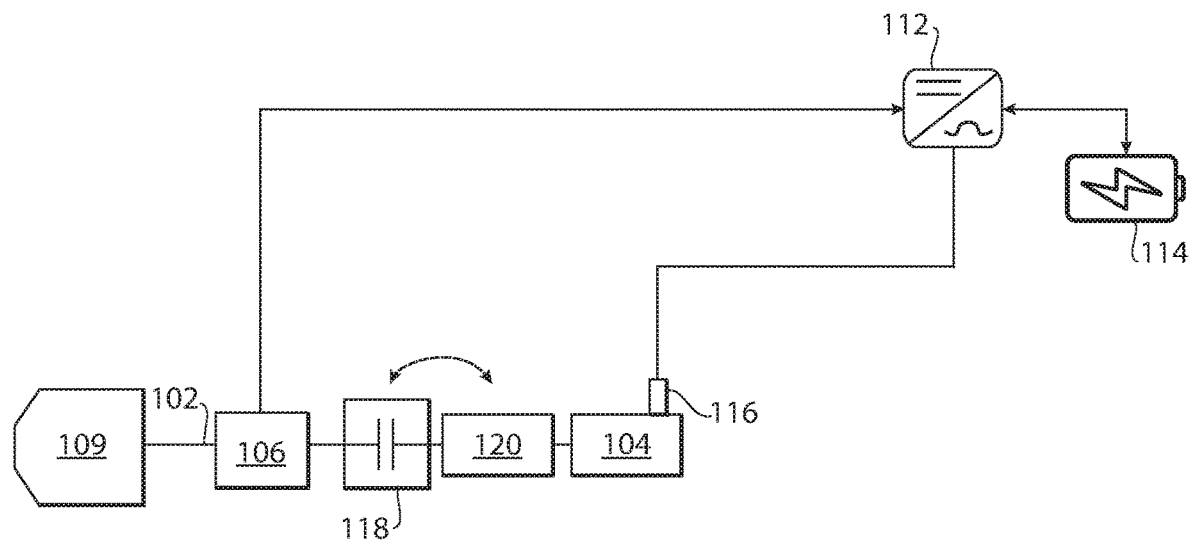
FIG. 2 is a schematic view of an embodiment of a system constructed in accordance with the present disclosure, showing a series configuration of the heat engine and electric motor.

With reference now to FIG. 2, another configuration is shown for the system 100 similar in most respects to the configuration shown in FIG. 1, but wherein the power train 102 includes a main reduction gear box 109 with the electric motor 106 and heat engine 104 connected in series with one another and to the main reduction gear box 109. In this configuration, the system 100 can providing thrust from the heat engine 104 and electric motor 106 to the main reduction gear box 109 wherein the main reduction gear box 109, heat engine 104, and electric motor 106 are mechanically in series with one another. The heat engine 104 and electric motor 106 can be connected in mechanical series with at least one of a disconnect mechanism 118 configured to allow independent rotation of the electric motor 106 and heat engine 104, and/or a reduction gear box 120 configured to allow rotation of the electric motor 106 and heat engine 104 at different rotational speeds from one another. Those skilled in the art will readily appreciate that disconnect mechanism 118 and reduction gear box can be omitted in suitable applications without departing from the scope of this disclosure. With respect to the controller 112, it operates similarly in both the configuration of FIG. 1 and the configuration of FIG. 2. It is contemplated that in the configuration of FIG. 1, reducing/eliminating torque ripple from the heat engine 104 can reduce wear and tear on the reduction gear box 110, which receives the combined torque from the combining gear box 108, extending the useful life of the reduction gear box 110 and or reducing component weight because of the reduced tendency for wear and tear. It is also contemplated that in the configuration shown in FIG. 2, reducing/eliminating torque ripple from the heat engine 104 can reduce wear and tear on the main reduction gear box 109, extending the useful life of the main reduction gear box 109.

Figure 3:
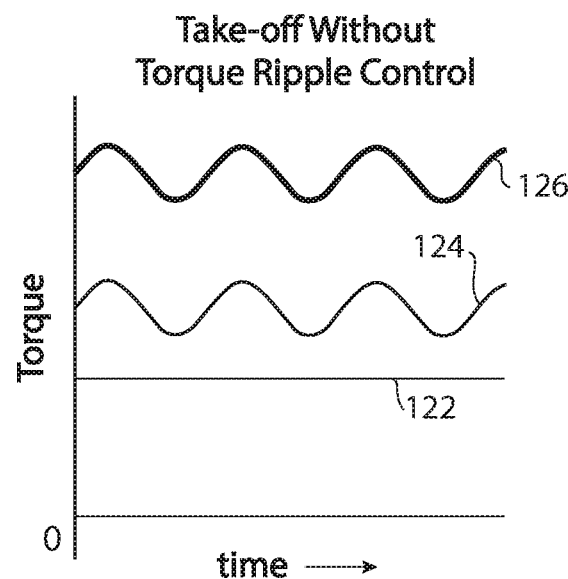
FIGS. 3 and 4 are plots showing the effect on combined torque during takeoff and climb without and with torque ripple control, respectively.
Figure 4:
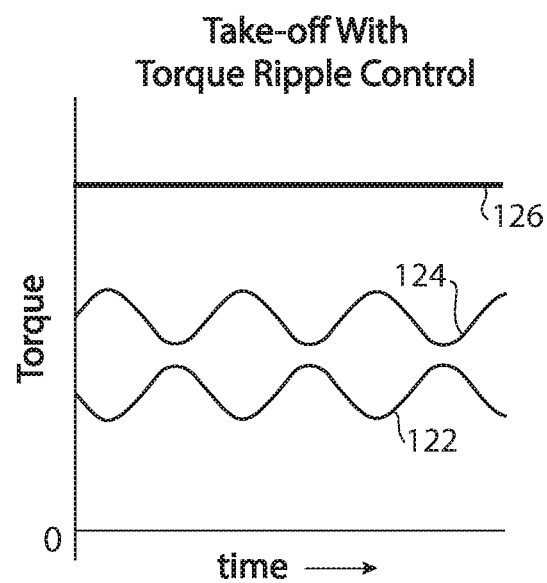

With reference now to FIGS. 3 and 4 (reference characters listed in describing FIGS. 3 and 4 that are not found in FIGS. 3 and 4 can be found in FIGS. 1 and 2), during takeoff and climb the system 100 shown in FIGS. 1-2 can power the power train 102 with both the heat engine 104 and the electric motor 106 providing a combined torque 126. FIG. 3 plots the torque 122 from the electric motor 106, the torque 124 from the heat engine 104, and the combined torque 126 from both if there is no torque ripple control. In contrast, FIG. 4 shows the same plots of torques 122, 124, 126 when the controller 112 controls the electric motor 106 in a manner that controls torque ripple. The electric motor 106 actively cancels torque ripple in the heat engine 104 from the power train 102 so that the combined torque 126 has a lower amplitude than that of the torque ripple in the heat engine, i.e., in an ideal case the combined torque 126 is constant during takeoff and climb. If the torque ripple is eliminated, it can be said that the frequency of torque ripple in the combined torque 126 is reduced to zero. The combined torque 126 is higher than the highest peaks in the torque ripple of the torque 124 of the heat engine 104 in FIG. 4, however as other discussed below this is not necessarily always the case. The torque 122 from the electric motor 106 is out of phase in a counter-cyclic manner relative to the torque 124 from the heat engine 104, and has the same amplitude (i.e., the amplitude has the same magnitude but varies in the opposite direction over time), effectively canceling out the torque ripple in the combined torque. This is also true in FIGS. 5 and 6 described below.

Figure 5:
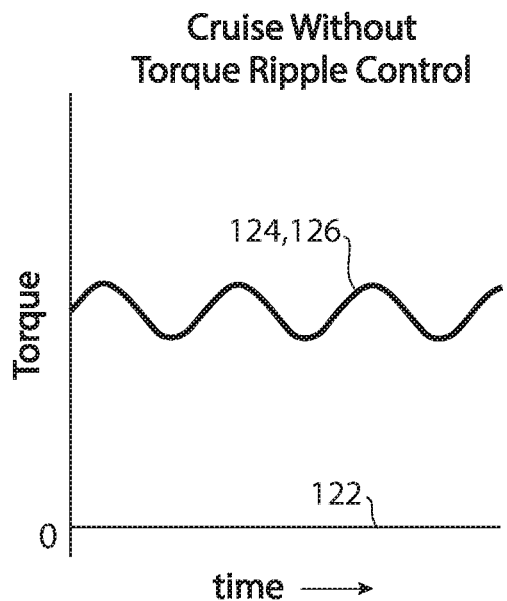
FIGS. 5 and 6 are plots showing the effect on combined torque during cruise without and with torque ripple control, respectively.
Figure 6:
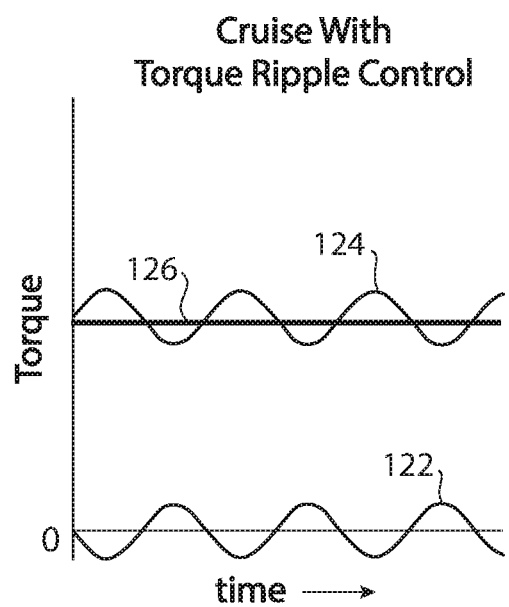

With reference now to FIGS. 5 and 6 (reference characters listed in describing FIGS. 5 and 6 that are not found in FIGS. 5 and 6 can be found in FIGS. 1 and 2), during cruise the system 100 can power the power train 102 with the heat engine 104 with zero net power delivered to the power train 102 by the electric motor 106. FIG. 5 plots the torque 122 from the electric motor, which is zeroed out, the torque 124 from the heat engine, and the combined torque 126, which matches the torque 124, when there is no torque ripple control. In contrast, FIG. 6 shows the same plots of torques 122, 124, 126, when the controller 112 controls the electric motor in a manner that controls the torque ripple. The electric motor 106 can alternate between positive, additive torque relative to the heat engine 104, and negative, subtractive torque relative to the heat engine 104 to cancel the torque ripple. The electric motor 106 can alternate between the positive, additive torque and the negative, subtractive torque without changing rotation direction of the electric motor 106. The controller 112 can control the electric motor 106 to recuperate electrical energy from the electric motor 106 into the electrical power storage system 114 during the negative, subtractive torque. The heat engine 104 and electric motor 106 together can provide a combined torque 126 having a magnitude that is between peaks and valleys in the torque ripple of the torque 124 of the heat engine 104, e.g. wherein the combined torque 126 is ideally constant during cruise.

Using the controller 112 and electric motor 106 to reduce and/or eliminate torque ripple in the power train 102, there are potential advantages including weight savings. For instance, with the systems and methods disclosed herein, a flywheel and/or torque damping system, and the associated weight, can be eliminated while still protecting gear boxes from the wear and tear that could otherwise be caused by torque ripple. The torque ripple is shown and described herein as a sine wave, however those skilled in the art will readily appreciate that torque ripple reduction as disclosed herein can be used on any form of toque ripple without departing from the scope of this disclosure.

The methods and systems of the present disclosure, as described above and shown in the drawings, provide for reduction or elimination of torque ripple in hybrid electric power trains. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   providing thrust to an aircraft through a power train from a heat engine connected to the power train;
   controlling an electric motor connected to the power train to counter torque ripple in the power train from the heat engine; and
   detecting torque ripple and using feedback indicative of the torque ripple in the heat engine to control the electric motor, wherein a sensor operatively connected to a controller senses the torque ripple in the heat engine and controls the electric motor to counter the torque ripple with an active, closed control loop.

2. The method as recited in claim 1, further comprising powering the power train with both the heat engine and the electric motor providing a combined torque during takeoff and climb, wherein the electric motor actively cancels torque ripple in the heat engine so that the combined torque has a lower amplitude than that of the torque ripple in the heat engine.

3. The method as recited in claim 2, wherein the combined torque is constant.

4. The method as recited in claim 2, wherein the combined torque is higher than peaks in the torque ripple of the heat engine.

5. The method as recited in claim 1, further comprising powering the power train with the heat engine during cruise with zero net power delivered to the power train by the electric motor.

6. The method as recited in claim 5, wherein the electric motor alternates between positive, additive torque relative to the heat engine, and negative, subtractive torque relative to the heat engine to cancel the torque ripple.

7. The method as recited in claim 6, wherein the electric motor alternates between the positive, additive torque and the negative, subtractive torque without changing rotation direction of the electric motor.

8. The method as recited in claim 6, further comprising recuperating electrical energy from the electric motor into an electrical power storage system during the negative, subtractive torque.

9. The method as recited in claim 5, wherein the heat engine and electric motor together provide a combined torque having a magnitude that is between peaks and valleys in the torque ripple of the heat engine.

10. The method as recited in claim 9, wherein the combined torque is constant.

11. The method as recited in claim 1, wherein providing thrust from the heat engine and power train includes providing the thrust from the heat engine to a combining gear box, and providing the thrust from the electric motor to the combining gear box in parallel mechanically with the heat engine.

12. The method as recited in claim 1, wherein providing thrust from the heat engine and power train includes providing the thrust from the heat engine to a main gear box wherein the main gear box, heat engine, and electric motor are mechanically in series with one another.

13. The method as recited in claim 12, wherein the heat engine and electric motor are connected in mechanical series with at least one of:
   a disconnect mechanism configured to allow independent rotation of the electric motor and heat engine; and/or
   a reduction gear box configured to allow rotation of the electric motor and heat engine at different rotational speeds from one another.

14. A system comprising:
   a power train for providing thrust to an aircraft;
   a heat engine connected to the power train;
   an electric motor operatively connected to the power train, wherein the power train further includes a combining gearbox, wherein each of the heat engine and electric motor connect to the combining gear box in parallel with one another, wherein the combining gearbox provides rotational power to a reduction gearbox;
   a controller operatively connected to control the electric motor wherein the controller includes machine readable instructions configured to cause the controller to:
   control the electric motor to counter torque ripple in the power train from the heat engine; and
   a sensor operatively connected to any one of the heat engine, the reduction gearbox, the power train and/or the combining gearbox and to the controller to sense torque ripple in the heat engine to generate feedback indicative of the torque ripple so the controller can control the electric motor to counter the torque ripple with an active, closed control loop.

15. The system as recited in claim 14, further comprising a power storage system operatively connected to the controller and electrically connected to supply electrical power to the electric motor.

16. The system as recited in claim 15, wherein the controller includes machine readable instructions configured to cause the electric motor to regenerate power to the power storage system during negative torque in the electric motor while countering torque ripple.

17. A system comprising:
   a power train for providing thrust to an aircraft;
   a heat engine connected to the power train;
   an electric motor operatively connected to the power train, wherein the power train further includes a main reduction gearbox, wherein the heat engine and the electric motor are connected in series with one another and with the main reduction gearbox,
   a disconnect mechanism operatively connected between the electric motor and the heat engine configured to allow independent rotation of any one of the heat engine, the electric motor, and/or a reduction gearbox connected between the disconnect mechanism and the heat engine;

a controller operatively connected to control the electric motor wherein the controller includes machine readable instructions configured to cause the controller to: control the electric motor to counter torque ripple in the power train from the heat engine; and a sensor operatively connected to any one of the heat engine, the reduction gearbox, the power train and/or the combining gearbox and to the controller to sense torque ripple in the heat engine to generate feedback indicative of the torque ripple so the controller can control the electric motor to counter the torque ripple with an active, closed control loop.

18. The system as recited in claim 17, further comprising power storage system electrically connected to supply electrical power to the electric motor.

* * * * *